Nov. 23, 1926.
J. H. GRAHAM
TAPPING MACHINE
Filed July 25, 1921    7 Sheets-Sheet 7
1,607,614
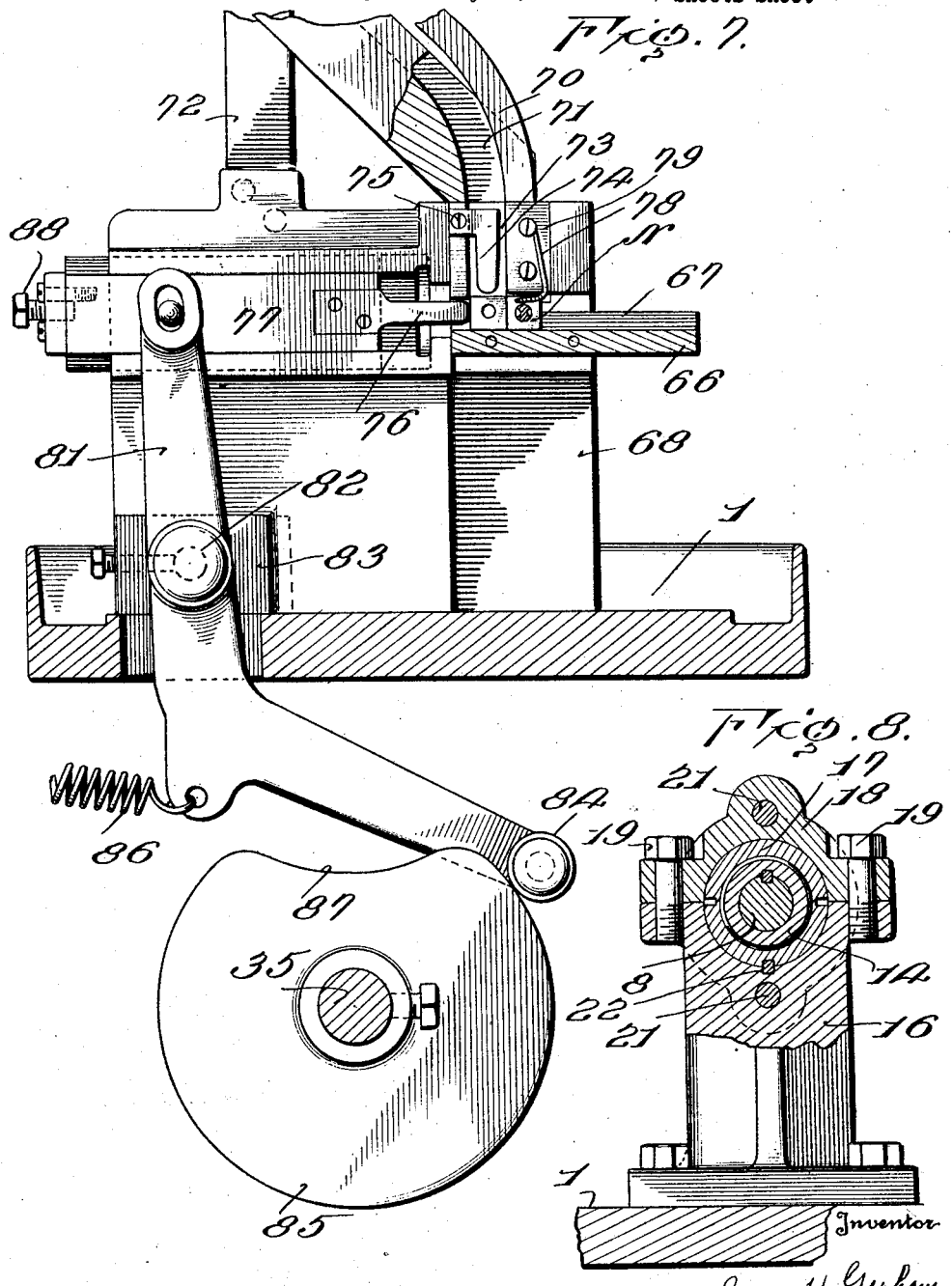

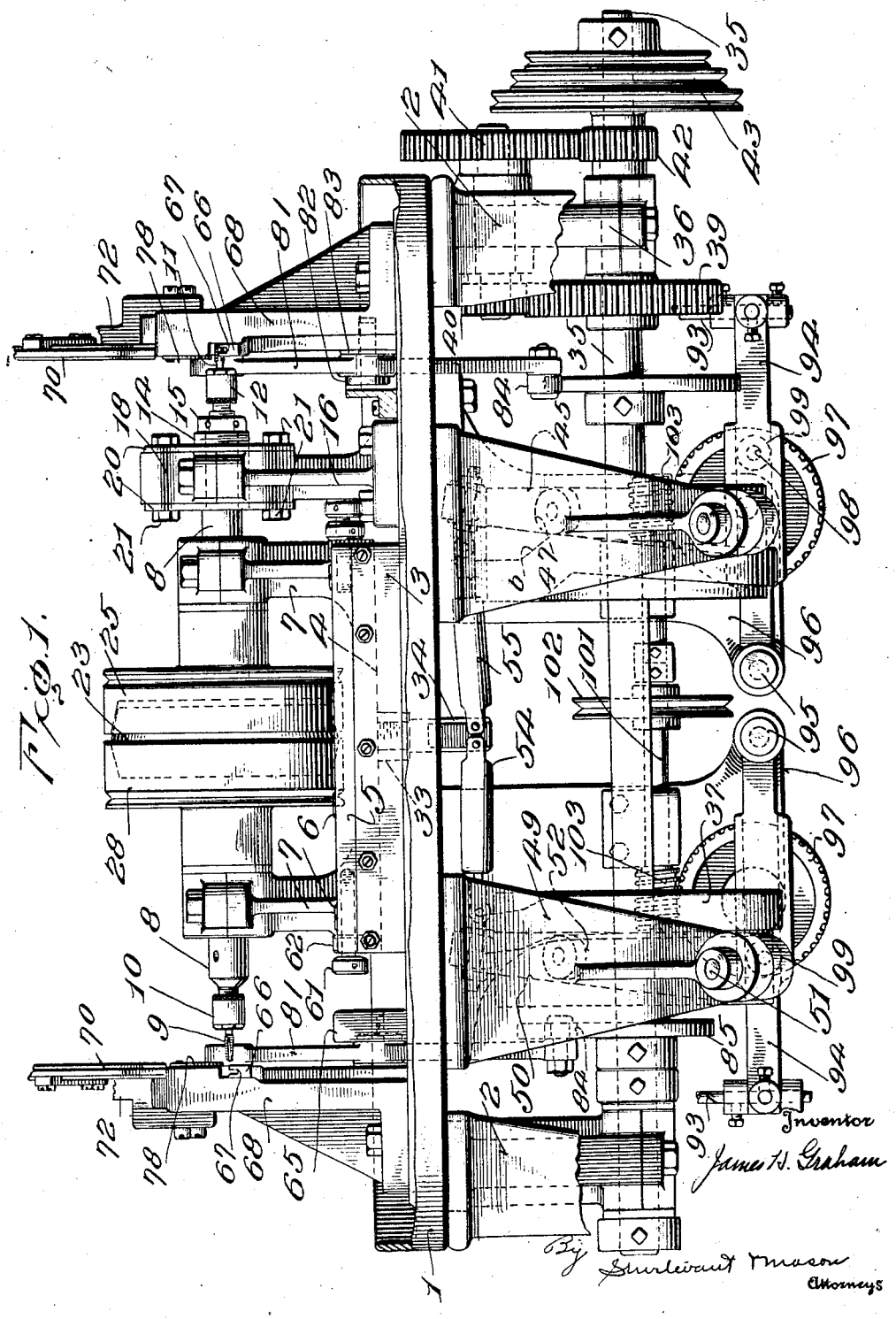

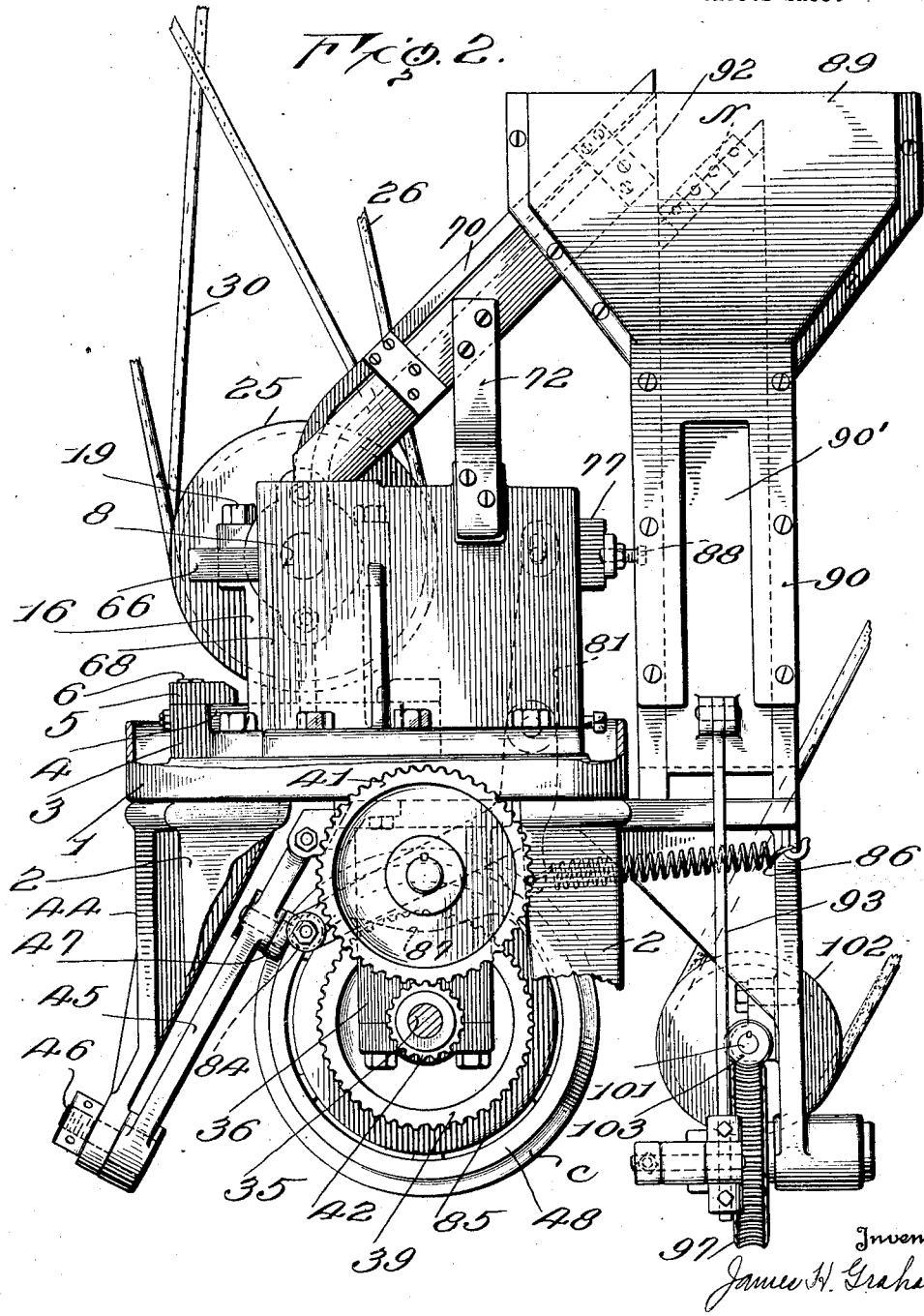

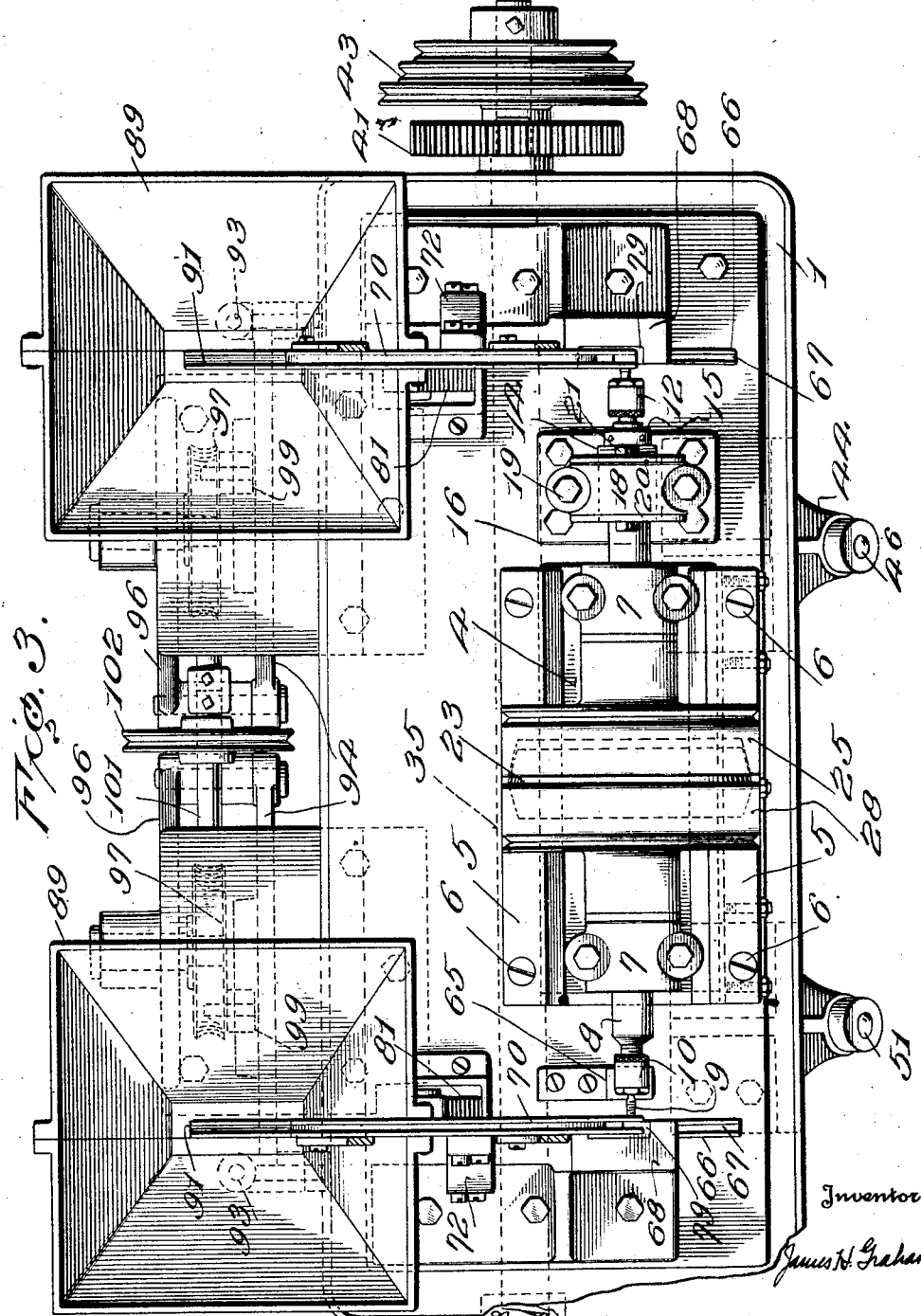

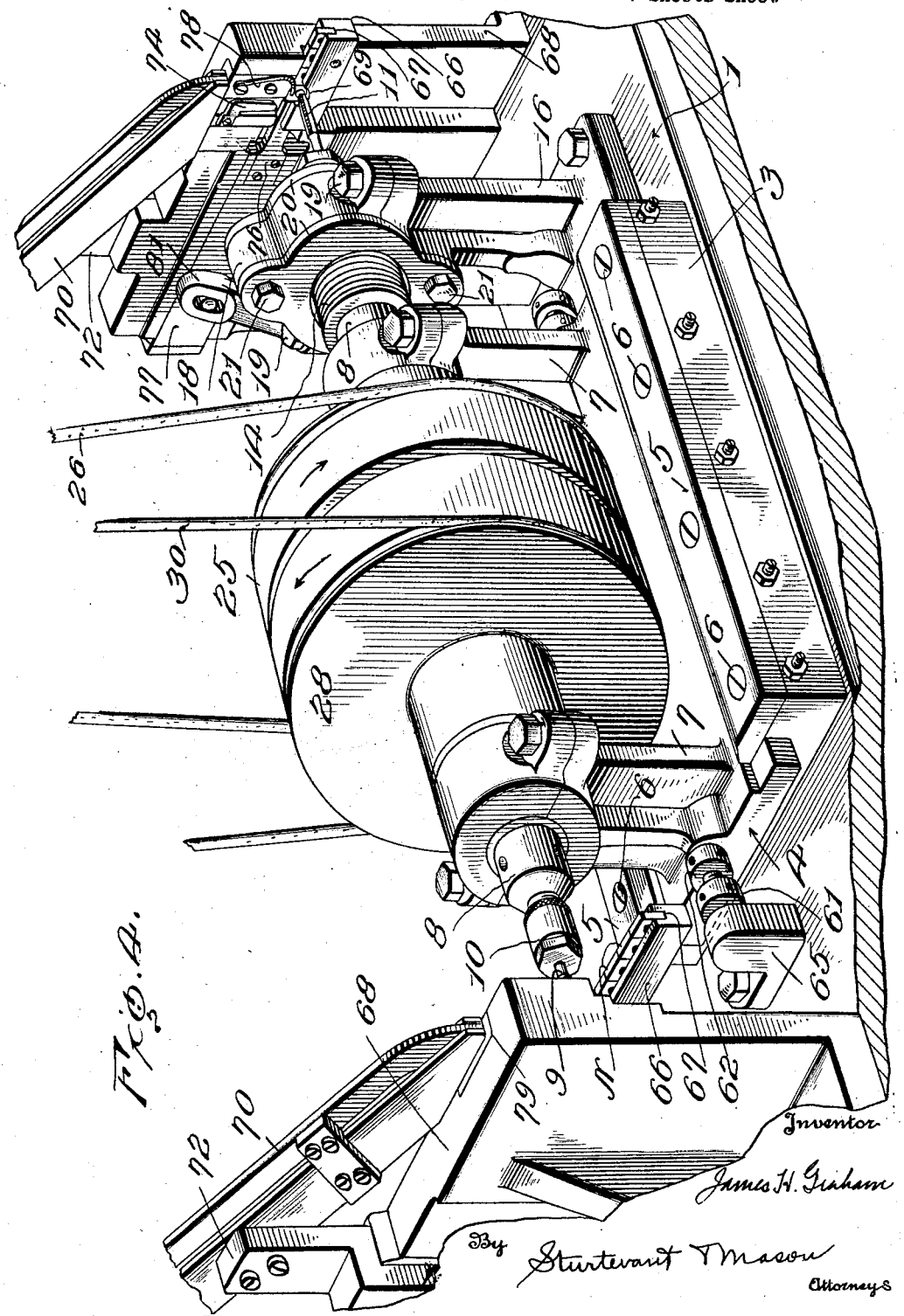

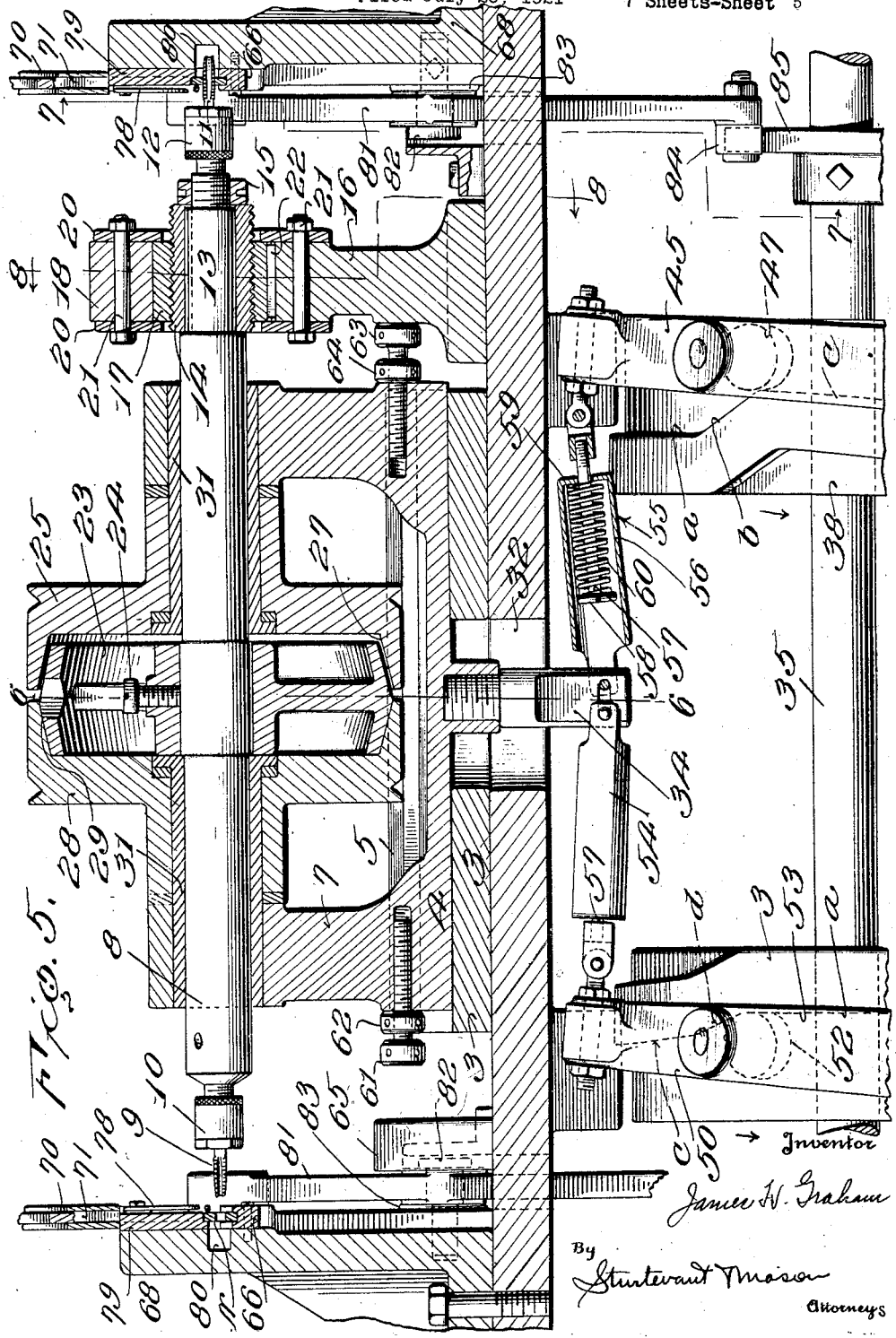

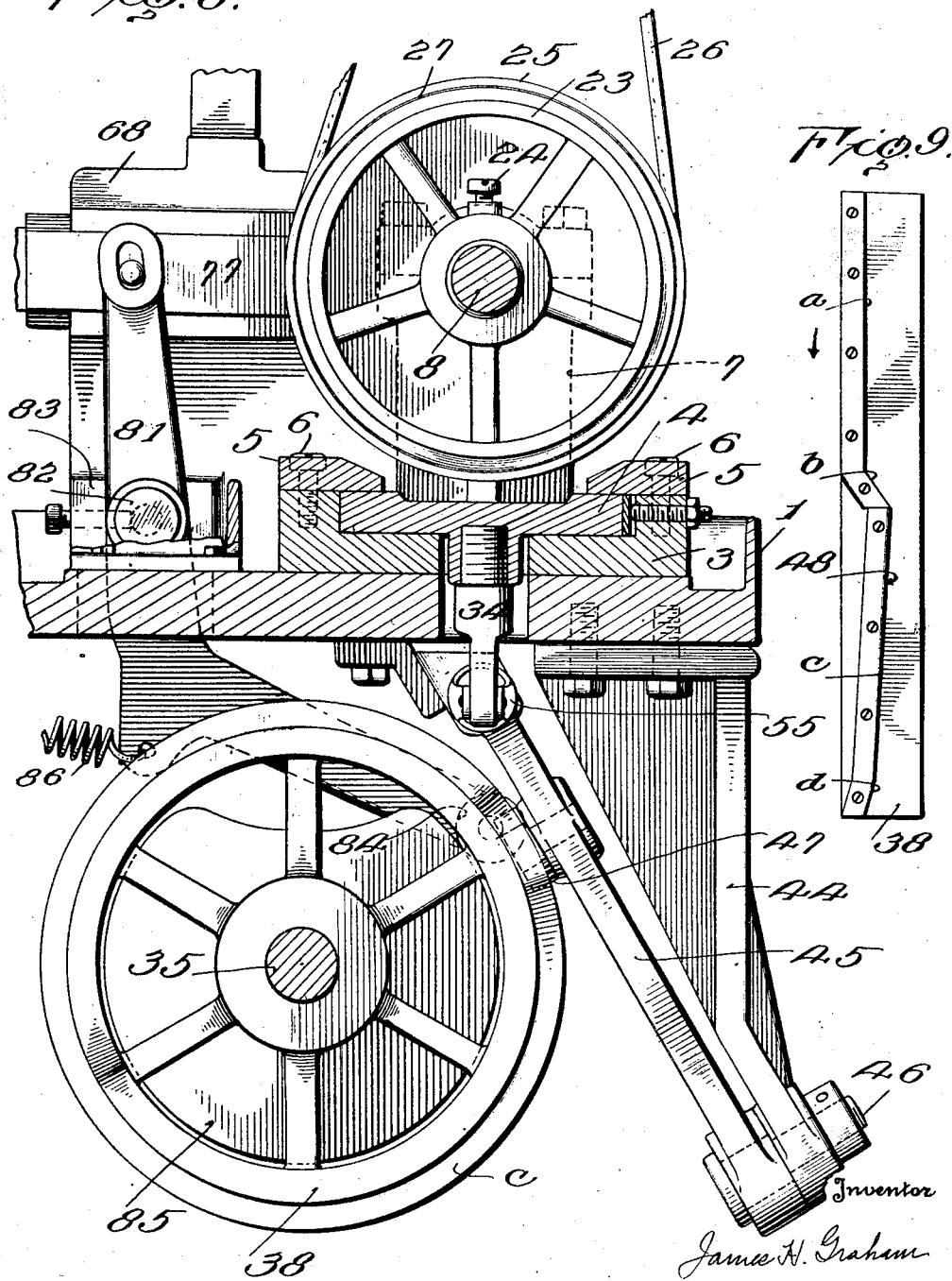

Patented Nov. 23, 1926.

1,607,614

UNITED STATES PATENT OFFICE.

JAMES H. GRAHAM, OF TORRINGTON, CONNECTICUT, ASSIGNOR TO TORRINGTON COMPANY, OF TORRINGTON, CONNECTICUT, A CORPORATION OF CONNECTICUT.

TAPPING MACHINE.

Application filed July 25, 1921. Serial No. 487,302.

The invention relates to new and useful improvements in machines for tapping articles, such as nuts or the like.

An object of the invention is to provide a machine of the above type wherein the tap is automatically fed into and out of the article being tapped by threaded members, and wherein the reversing mechanism for the tap is so constructed that said threaded members are readily interchangeable with others having a greater or less number of threads to the inch, and without altering in any way, said reversing mechanism.

A further object of the invention is to provide a machine of the above type with two or more tapping members which are so arranged that when one tap is threading an article the other is being withdrawn from another article.

A still further object of the invention is to provide a machine of the above type wherein the taps are carried at the opposite ends of a shaft on which is fixed one member of a friction clutch, and wherein oppositely rotated friction clutch members are alternately brought into engagement therewith by the movement of a carriage which is automatically controlled.

A still further object of the invention is to provide a machine of the above type wherein the carriage is moved by cam actuated levers and yielding connecting links between the levers and carriage.

A still further object of the invention is to provide a machine of the above type wherein adjustable stops are provided for the carriage which insure the disconnection of the rotated clutch members from the clutch member on the shaft carrying the taps at predetermined points.

A still further object of the invention is to provide a tapping machine wherein the nut being tapped is loosely supported, held from rotation and positioned at right angles to the axis of the tap by a supporting plate engaging the back side of the nut.

These and other objects will in part be obvious and will in part be hereinafter more fully disclosed.

In the drawings which show by way of illustration one embodiment of the present invention:—

Figure 1 is a view partly in front elevation and partly in section of a machine embodying my improvements;

Fig. 2 is an end view of the same with parts broken away to show some of the mechanism in rear thereof;

Fig. 3 is a top plan view of the machine;

Fig. 4 is a perspective view of the parts of the machine above the supporting table;

Fig. 5 is a vertical sectional view through the upper part of the machine and on the line of the shaft carrying the taps;

Fig. 6 is a transverse sectional view on the line 6—6 of Fig. 5;

Fig. 7 is a transverse sectional view on the line 7—7 of Fig. 5;

Fig. 8 is a view in vertical section on the line 8—8 of Fig. 5, and

Fig. 9 is a view showing the development of one of the cams for reversing the rotation of the tap.

The invention consists broadly in a machine for tapping articles such as nuts or the like, which includes a supporting table on which is mounted a shaft carrying at each end thereof a tap. Means is provided for feeding nuts or the articles to be tapped, one at a time, and positioning the same for engagement by the taps. When nuts are being tapped, they are loosely held and at the same time prevented from rotation. When the taps enter the hole in the blank to form the nut, the blank is forced against the plate which engages the back of the nut, and thus the nut is held in a plane at right angles to the axis of the tap. The shaft is mounted in a carriage which is capable of being moved endwise of the shaft and permitting the shaft also to move endwise in the carriage. The shaft is moved endwise by a threaded member carried thereon which cooperates with a threaded sleeve held by a fixed bracket. These threaded members may be readily interchanged with other threaded members having a different number of threads per inch, and the threaded member determines the threads per inch cut in the nuts or articles being threaded. Secured to the shaft is one member of a friction clutch while the carriage carries two oppositely rotating members which are alternately adapted to engage the friction clutch member secured to the shaft. The carriage is moved endwise by two levers which are actuated by cams, first in one direction and then in the other, and these levers are connected by yielding links to the carriage. Stops are provided for limiting the movement of the carriage. Means is also provided for feeding the nuts automatically, one at a time, to the taps.

The invention will be better understood by a detail reference to the drawings, in which I have shown my improved machine as consisting of a supporting table 1 carried by legs 2, 2. Mounted on the table 1 is a base block 3 in which a carriage 4 is adapted to reciprocate. The base block 3 is provided with a recess adapted to receive said carriage, and bars 5, 5 secured to the base block by screws 6 serve to hold the carriage on the base block. At each end of the carriage there is a standard 7. Mounted in suitable bearings carried by the standard 7 is a shaft 8. This shaft extends beyond the end of the carriage. At the left-hand end of the shaft there is a tap 9 which is secured to the shaft by a suitable hand-operated clamp 10 which may be of the usual construction. At the other end of the shaft 8 there is a tap 11 which is also secured to the shaft by means of a hand clamp 12. Between the hand clamp 12 and the end of the shaft projecting from the bearing in the right-hand standard 7, said shaft has a reduced portion 13 on which is splined a threaded sleeve 14. Said sleeve is held on the reduced portion of the shaft by means of a nut 15.

Mounted on the table 1 is a standard 16. Said standard 16 is adapted to receive a threaded sleeve 17. The standard is made with an upper detachable cap plate 18 which is secured to the standard by means of bolts 19, 19 (see Fig. 4). At each side of the standard, there are plates 20, 20 which are secured to the standard by means of bolts 21, 21. This permits the sleeve 17 to be detachably held by the standard and the sleeve is secured by means of a spline 22 to the standard so as to prevent its rotation. This sleeve 17 together with the sleeve 14 are the threaded feed members for feeding the shaft 8 carrying the taps endwise, and they are made so that they can be readily exchanged for other threaded members having a greater or less number of threads per inch, and the number of threads on these threaded members per inch determines the pitch of the thread on the nuts being tapped.

The shaft 8 is rotated by means of a double cone-shaped friction pulley 23 which is secured to the shaft by means of a set screw 24. Loosely mounted on the shaft 8 is a pulley 25 which rotates in the direction of the arrow (see Fig. 4). Said pulley has a groove for a driving belt 26. Said pulley also has an inner cone-shaped recess 27 which is adapted to engage frictionally one side of the double cone-shaped pulley 23. Also loosely mounted on the shaft 8 is a second pulley 28. Said pulley 28 is likewise provided with an inner cone-shaped recess 29 adapted to cooperate with the other half of the double cone-shaped pulley 23. Said pulley 28 is provided with a groove for a driving belt 30 and said pulley 28 is driven in the direction of the arrow indicated in Fig. 4. The pulleys are held from endwise movement on the carriage by being mounted on sleeves 31, 31 which are secured to the standard 7, 7, and the shaft 8 rotates within said sleeves and is capable of limited endwise movement therein, while the pulleys, as above noted, do not have any endwise movement on the sleeves.

The table 1 is provided with a slot 32. The carriage 4 is provided with a depending threaded boss 33 which extends through a slot in the base block 3 and into the slot 32. Threaded into this boss is a depending stud 34. Mounted on the shaft 35 supported in suitable bearings carried by depending hangers 36, supported by the table 1, are two cams 37 and 38. The shaft 35 is provided with a gear wheel 39 which meshes with a gear wheel 40 on a short shaft carried by one of the hangers 36. On the other end of the short shaft is a gear wheel 41 which meshes with gear wheel 42, which is free to turn on the shaft 35. The pulley 43 is forced over a projecting sleeve of said gear 42, and both are held in position on the shaft 35 by a collar.

Mounted on a bracket 44 depending from the table 1 is a lever 45. Said lever is pivoted at 46 to the bracket. Mounted on the lever 45 intermediate its ends is a roller 47 which is adapted to engage the cam face 48 of the cam 38. At the other side of the machine is a depending bracket 49 to which a lever 50 is pivoted at 51, and said lever 50 carries intermediate its ends a roller 52 which is adapted to engage the cam face 53 of the cam 37. The lever 50 is pivotally connected to a link 54 and the link 54 is in turn pivotally connected to the stud 34. The lever 45 is pivotally connected to a link 55 which is in turn pivotally connected to the stud 34. These two links 54 and 55 are similar in construction, and each consists of an outer sleeve 56 which is pivotally connected to the depending stud 34 and an inner rod 57 which is pivotally connected to the levers. Said rod 57 is provided with a head 58, while the sleeve is provided with a closed outer end 59 perforated to allow the rod 57 to pass through. A spring 60 encircling the rod, bears at one end against the inner end of the sleeve and at its other end against the head 58. This makes a yielding link.

The cam 38 is shown in development in Fig. 9. Said cam 38 is provided with a face cam 48 which includes a section $a$ which is parallel with the side face of the cam 38, a sharply inclined section $b$, a gradually inclined section $c$ which leads into a sharply inclined section *d*. The cam travels in the direction of the arrow shown in Figures 5 and 9. The cam 37 at the other side of the machine is similar in construction to the cam 38, except that the cam face is on the other side of the cam and the straight section *a* on one cam is set opposite the inclined sections *b* and *c* on the other cam.

It is thought that the operation of the machine will be obvious from the detail description given above. When the parts are in the position shown in Fig. 5, the nut at the right-hand side of the machine has been tapped and the machine is about to automatically reverse for withdrawing the tap from this nut causing the tap 9 to enter the nut at the left-hand end of the machine. The roller 47 is just about to pass down the inclined portion *b* of the cam 38 which of course, will release the stud 34 from the tension pull of the yielding link 56. The roller 52 on the lever 50 is just about to pass up the inclined section *d* and on to the gradual inclined section *c*. This puts the link 55 under tension and causes the carriage 4 to quickly shift from the position shown in Fig. 5 so as to bring the driving pulley 25 into frictional engagement with the double cone-shaped pulley 23. The gradual inclined section *c* will continue to keep the link 55 under sufficient tension to move the carriage and hold the pulley 23 in frictional gripping contact with the pulley 25. The roller 47 is now running on the straight portion *a* of the cam 38. The shaft 8 is now turned in a clockwise direction as viewed from the right-hand end of Fig. 5, and this will cause the tap 11 to be withdrawn from the nut which has just been tapped thereby and the tap 9 will enter the nut at the other side of the machine. After the nut at the left of the machine has been tapped, then the cam 38 comes into play to again reverse the carriage, and cause the driving pulley 28 to grip the double cone-shaped pulley 23, reverse the movement of the shaft 8 and move the shaft in the other direction. The yielding links 55 and 56 not only enable different threaded members to be used without altering the reversing mechanism, but will also take care of any out of timing in the parts and permits the members 25 and 28 to be driven by belts which are independent of the belt drive for the shaft 35.

It will readily be seen that the threaded members 14 and 17 may be quickly removed from the machine and other threaded members substituted therefor, wherein the threads are either of greater or less number per inch. If the threads are a less number per inch, then the shaft 8 will be moved endwise more rapidly, and if they are a greater number per inch then the shaft 8 will be moved endwise less rapidly. This of course, results in a slower lateral movement in the stud 34. The yielding links 55 and 56 take care of this change in the timing of the movement of the stud 34 relative to the timing of the shifting of the levers 45 and 50 so that I am able to thread articles or nuts with any desired number of threads per inch, and to go quickly from one character of threading to the other without making any alterations whatever in the reversing mechanism which reverses the movement of the shaft carrying the taps.

Mounted on the carriage 4 is an adjustable stop 61 which is held in adjusted positions by the lock nut 62. At the other end of the carriage there is an adjustable stop 63 which is held in adjustable positions by the lock nut 64. These stops have nothing whatever to do with the reversing of the movement of the carriage. They are merely for the purpose of preventing accidental overrunning of the carriage through the setting of the driving pulleys in contact with the double cone-shaped pulley on the driving shaft. For example, when the parts are in the position shown in Fig. 5, the machine is about to reverse. Let us assume that the pulley 28 is set or stuck to the pulley 23 so that the link 55 cannot shift the carriage. The stop 63 will come in contact with the standard 16 and stop further movements of the carriage, and then any continued turning of the shaft 8 with the pulley 23 gripped to the pulley 28 will move the shaft 8 to the left, while movements of the pulley to the right will cease. This will serve as a positive means to disengage the pulley 23 from the pulley 28 and allow the link 55 to come into play to shift the carriage to cause the machine to reverse.

My machine is particularly adapted for threading nuts. The nut feeding mechanism for positioning the nuts for being tapped is the same at opposite sides of the machine, and the description of one nut feeding mechanism will answer for the other. The nuts are supported by a supporting plate 66 which is provided with a recess 67 which throughout a greater part of the plate is of slightly greater depth than half the nut. This plate 66 is carried by a standard 68 which in turn is secured to the table 1 of the machine. The upper portion of the plate 66 is cut away at 69 to permit the tap to enter the opening in the nut for threading the same. The nuts are fed to the plate 66 by means of an inclined chute 70. Said chute 70 has a suitable raceway 71 formed therein down which the nuts slide. The chute 70 is supported by means of a bracket 72 carried by the standard 68. The standard has a recess 73 which is in line with the recess 71 in the chute 70 and said nuts drop down through the recess 73 into the recess 67 in the supporting plate 66. A spring clip 74 secured by a screw 75 to the standard 68 serves as a yielding means to guide the nuts, one at a time, into the recess 67. The nuts are fed forward to tapping position by means of a feed finger 76. Said feed finger 76 is secured to a slide 77 which is reciprocated back and forth. The finger pushes the nut forward to the position indicated at n in Fig. 7. A yielding finger 78 holds the nuts well back against the back plate. Mounted in the standard is a plate 79. Said plate 79 overhangs the recess 67 in the supporting plate 66. It is also recessed so as to form a supporting backing for the nut. The distance between this plate 79 directly over the nut and the lower part of the recess 67 is such as to prevent the nut from turning, although the nut freely rests in these recesses. The standard is also recessed as indicated at 80 in Fig. 5, to form a clearance space for the tap. When the tap enters the blank to form the nut, the nut will be pressed back against the plates in rear thereof, and positioned in a plane at right angles to the axis of the tap. This insures that the hole in the nut will be tapped so as to lie in a line at right angles to the face of the nut.

The slide 77 is reciprocated by means of a lever 81. Said lever 81 is pivoted at 82 to a bracket 83 secured to the table 1. The lever projects beneath the table and carries a roller 84 adapted to engage the face cam 85. A spring 86 forces the lever into contact with the face cam. Said face cam is concentric for a greater portion of its circumference and is formed with a cut-away cam surface 87. It will be noted that the spring normally forces the lever in a direction to carry the finger 76 forward to move the nut into position for being tapped. The cam 85 retracts the slide and permits the nuts to drop in front of the finger through the weight of the nuts in the chute. As above noted, the spring 86 operates to move the lever so as to force the finger 76 inwardly or to the right as viewed in Fig. 7, to position the nut for tapping. The inward movement of this slide 77 is limited by an adjustable screw 88 which contacts with the standard 68. By adjusting this screw 88, the nut may be properly positioned to be tapped. The cam portion 87 positively retracts the lever. The supporting plate 66 is screwed to the standard 68 and may be readily interchanged with other supporting slides for varying sized nuts within certain limits.

The nuts are fed into the chute 70 from a hopper 89. Said hopper 89 in which the nuts are placed promiscuously is carried by the standard 90. Reciprocating up through the bottom of the hopper 89 is a lifting plate 90' which is provided with a groove 91 in its upper face. There is a vertical wall 92 which closes the bottom end of the groove 91. The upper end of the lifting plate 90' inclines at the same angle as the inclination of the chute. As this lifting plate is raised, it will pick up a certain number of nuts as indicated in dotted lines in Fig. 2, and when the lifting plate reaches the point where it is in alinement with the chute, then the nuts will slide by gravity down into the chute. This plate 90' is raised and lowered by means of a link 93. The link 93 is connected at its lower end to a lever 94. Said lever 94 is pivoted at 95 to a bracket 96. The lever is raised and lowered by means of a rotating gear 97 also mounted on the bracket 96. Said gear 97 carries a pin 98 on which is mounted a roller 99. The roller 99 runs between parallel side plates carried by the lever 94, and as the worm wheel 97 rotates, it will thus raise and lower the lever 94. It is understood, of course, that there is a similar chute and feeding mechanism for the nuts at the other end of the machine, and the parts for operating the slide or lifting plate in the magazine or hopper is the same as those above described, and like numbers have been applied thereto. The two gear wheels 97, 97 are operated from a shaft 101. The shaft 101 is rotated by means of a belt wheel 102 and is provided with worm gears 103, 103, which engages respectively, the gears 97.

From the above it will be apparent that I have provided a tapping machine for tapping nuts or other articles, wherein the article to be tapped is loosely held so that the tap may properly center the blank and form a tapped hole at right angles to the face of the blank. While one nut is being tapped, the tap is being withdrawn from another nut which greatly increases the capacity of the machine. The machine may be quickly adjusted for tapping nuts with different numbers of threads per inch if desired, without altering in any way the automatic reversing mechanism for the taps. If, for any reason the shaft carrying the taps should get out of slight timing with the shaft reversing mechanism, still no harm will come therefrom for the reason that the reversing mechanism includes yielding links which accomplish the reversing of the movements of the tap carrying shaft.

It will be obvious that my improved tapping machine may be used for tapping other articles than nuts, and that the details of construction may be readily varied without departing from the spirit of the invention as set forth in the appended claims.

Having thus described the invention, what I claim as new and desire to secure by Letters Patent, is:—

1. A tapping machine comprising a tap, means for rotating said tap first in one direction and then the other, means for feeding said tap, and automatic means independent of the feeding means for reversing the rotation of said tap, said automatic means including positively actuated devices and yielding members, operated by said devices for reversing the rotation of the tap.

2. A tapping machine comprising a tap, means for rotating said tap, first in one direction and then the other, means for feeding said tap, and automatic means independent of the feeding means for reversing the rotation of said tap, said automatic means including positively actuated levers, and yielding members operated by said levers for reversing the feed of the tap.

3. A tapping machine comprising a shaft, a tap at each end of said shaft, means for moving the shaft endwise for feeding the tapping means for rotating said shaft, first in one direction and then the other, and automatic means independent of the feeding means for reversing the rotation of said shaft, said automatic means including positively actuated levers and yielding members operated by said levers for reversing the rotation of the shaft.

4. A tapping machine comprising a rotating shaft, a tap carried at each end of said shaft, a threaded member mounted on said shaft, a stationary standard, a threaded member mounted therein and co-operating with the threaded member on the shaft for feeding the taps, means for rotating said shaft first in one direction and then the other, including positively actuated devices and yielding members operated by said devices for reversing the rotation of the tap.

5. A tapping machine comprising a rotating shaft, a tap carried at each end of said shaft, a threaded member mounted on said shaft, a stationary standard, a threaded member mounted therein and cooperating with the threaded member on the shaft for feeding the taps, means for rotating said shaft, first in one direction and then the other, and automatic means for reversing the rotation of said shaft, said automatic means including positively actuated levers and yielding members operated thereby for reversing the rotation of the shaft.

6. A tapping machine comprising a rotating shaft, a tap carried at each end of said shaft, a threaded member mounted on said shaft, a stationary standard, a threaded member mounted therein and cooperating with the threaded member on the shaft for feeding the taps, a double cone friction pulley on said shaft, spaced friction driving pulleys adapted to alternately engage the double cone pulley on said shaft, a carriage on which said driving pulleys are mounted, said carriage being bodily movable with the shaft, and means for giving said carriage an independent movement for reversing the rotation of the shaft.

7. A tapping machine comprising a rotating shaft, a tap carried at each end of said shaft, a threaded member mounted on said shaft, a stationary standard, a threaded member mounted therein and cooperating with the threaded member on the shaft for feeding the taps, a double cone friction pulley on said shaft, spaced friction driving pulleys adapted to alternately engage the double cone pulley on said shaft, a carriage on which said driving pulleys are mounted, said carriage being bodily movable with the shaft, and means for giving said carriage an independent movement for reversing the rotation of the shaft, said means for reversing the rotation of the shaft including positively actuated levers and yielding members connecting said levers with said carriage.

8. A tapping machine comprising a rotating shaft, a tap carried at each end of said shaft, a threaded member mounted on said shaft, a stationary standard, a threaded member mounted therein and cooperating with the threaded member on the shaft for feeding the taps, a double cone friction pulley on said shaft, spaced friction driving pulleys adapted to alternately engage the double cone pulley on said shaft, a carriage on which said driving pulleys are mounted, said carriage being bodily movable with the shaft, and means for giving said carriage an independent movement for reversing the rotation of the shaft, said means for reversing the rotation of the shaft including rotating cams, a lever associated with each cam and positively moved thereby away from each other, yielding links connecting the respective levers with the carriage, said cams being so shaped as to cause the carriage to be quickly shifted to reverse the rotation of the shaft and to move the carriage to cause the same to follow the shaft during the feeding of the tap.

9. A tapping machine comprising a rotating shaft, a tap carried at each end of said shaft, a threaded member mounted on said shaft, a stationary standard, a threaded member mounted therein and cooperating with the threaded member on the shaft for feeding the taps, a double cone friction pulley on said shaft, spaced friction driving pulleys adapted to alternately engage the double cone pulley on said shaft, a carriage on which said driving pulleys are mounted, said carriage being bodily movable with the shaft, and means for giving said carriage an independent movement for reversing the rotation of the shaft, said means for reversing the rotation of the shaft including a stud depending from the carriage, two rotating cams, actuating levers operated by the respective cams, a link including spring separated telescoping parts for connecting each lever with said stud, said cams being constructed so as to move the levers to cause the carriage to be quickly shifted to reverse the rotation of the shaft and to permit the carriage to follow the shaft during the feed of the tap.

10. A tapping machine comprising a rotating shaft, a tap carried at each end of said shaft, a threaded member mounted on said shaft, a stationary standard, a threaded member mounted therein and cooperating with the threaded member on the shaft for feeding the taps, a double cone friction pulley on said shaft, spaced friction driving pulleys adapted to alternately engage the double cone pulley on said shaft, a carriage on which said driving pulleys are mounted, said carriage being bodily movable with the shaft, and means for giving said carriage an independent movement for reversing the rotation of the shaft, and adjustable stops carried by the carriage for limiting the movement thereof to insure the separation of the friction clutched members driving the shaft.

11. A tapping machine comprising a rotatable shaft, a tap carried at each end of said shaft, a threaded member mounted on said shaft, a stationary standard, a threaded member mounted therein and cooperating with the threaded member on the shaft for feeding the taps, a double cone friction pulley on said shaft, spaced friction driving pulleys adapted to alternately engage the double cone pulley on said shaft, a carriage on which said driving pulleys are mounted, said carriage being bodily movable with the shaft, means for giving said carriage an independent movement for reversing the rotation of the shaft, said means for reversing the rotation of the shaft including a stud depending from the carriage, two rotating cams, actuating levers operated by the respective cams, a link including spring separated telescoping parts for connecting each lever with said stud, said cams being constructed so as to move the levers to cause the carriage to be quickly shifted to reverse the rotation of the shaft and to permit the carriage to follow the shaft during the feed of the tap, and adjustable stops carried by the carriage for limiting the movements thereof to insure the separation of the friction clutched members driving the shaft.

12. A tapping machine comprising a supporting table, a carriage adapted to reciprocate thereon, standards carried by the carriage, sleeves carried by said standards, a shaft journaled on said sleeves and capable of endwise movement therein, a double cone friction pulley carried by said shaft, a tap at each end of said shaft, a removable threaded sleeve mounted on one end of said shaft, a standard independent of the carriage, a removable threaded sleeve carried by the standard and cooperating with the threaded sleeve on the shaft to feed the tap, two friction cone pulleys mounted on the respective sleeves on the carriage and adapted to alternately engage the double cone pulley carried by the shaft, a stud depending from the carriage, positively actuated levers, and yielding links connecting the respective levers with the stud for shifting the carriage to cause one or the other of the driving pulleys to engage the cone pulley on the shaft.

13. A tapping machine comprising a supporting table, a carriage adapted to reciprocate thereon, standards carried by the carriage, sleeves carried by said standards, a shaft journaled on said sleeves and capable of endwise movement therein, a double cone friction pulley carried by said shaft, a tap at each end of said shaft, a removable threaded sleeve mounted on one end of said shaft, a standard independent of the carriage, a removable threaded sleeve carried by the standard and cooperating with the threaded sleeve on the shaft to feed the tap, two friction cone pulleys mounted on the respective sleeves on the carriage and adapted to alternately engage the double cone pulley carried by the shaft, a stud depending from the carriage, two positively rotated cams, a lever associated with each cam, a link including yieldingly connected telescoping parts for connecting each lever with said stud, said cams being constructed so as to move the carriage quickly for reversing the rotation of the shaft and for causing the carriage to move endwise with the shaft during the feed of the taps.

14. A tapping machine comprising a supporting table, a carriage adapted to reciprocate thereon, standards carried by the carriage, sleeves carried by said standards, a shaft journaled on said sleeves and capable of endwise movement therein, a double cone friction pulley carried by said shaft, a tap at each end of said shaft, a removable threaded sleeve mounted on one end of said shaft, a standard independent of the carriage, a removable threaded sleeve carried by the standard and cooperating with the threaded sleeve on the shaft to feed the tap, two friction cone pulleys mounted on the respective sleeves on the carriage and adapted to alternately engage the double cone pulley carried by the shaft, a stud depending from the carriage, two positively rotated cams, a lever associated with each cam, a link including yieldingly connected telescoping parts for connecting each lever with said stud, said cams being constructed so as to move the carriage quickly for reversing the rotation of the shaft and for causing the carriage to move endwise with the shaft during the feed of the taps, and adjustable stops carried at the opposite ends of the carriage for insuring the separation of the clutched driving members.

15. A tapping machine comprising a movable carriage, a shaft mounted therein and movable endwise in said carriage, a double friction cone pulley carried by the shaft, driving pulleys adapted to engage alternately said cone pulley for rotating the shaft first in one direction and then the other, a standard at the end of the carriage, a threaded sleeve detachably connected to the shaft, a tap secured in the end of the shaft, a threaded sleeve detachably carried by said standard, face plates carried by the standard and adapted to prevent said sleeve carried thereby from moving endwise, and means for preventing said sleeve from rotating with the standard.

In testimony whereof, I affix my signature.

JAMES H. GRAHAM.